P. J. M. SULLIVAN.
INTERNAL COMBUSTION ENGINE.
APPLICATION FILED NOV. 30, 1917.
1,274,813.
Patented Aug. 6, 1918.
5 SHEETS—SHEET 2.
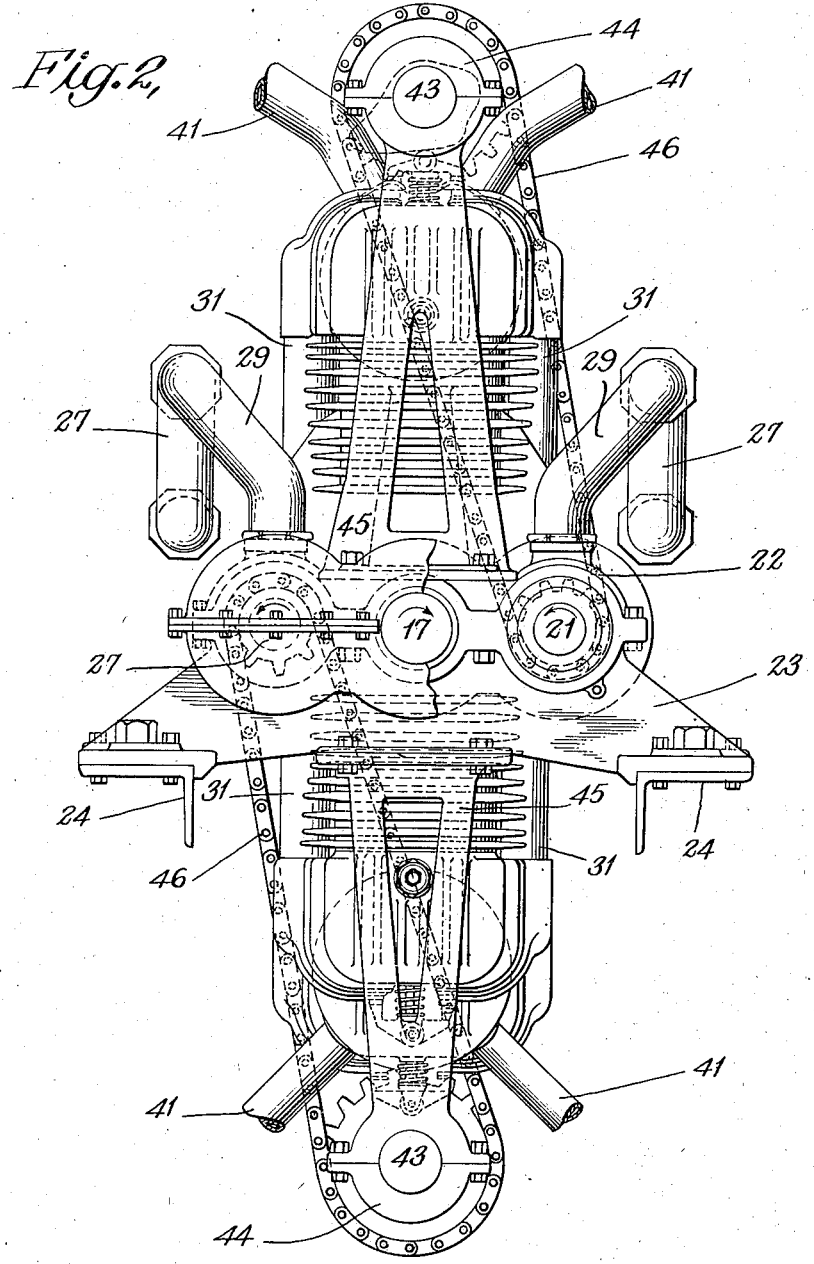
Fig. 2,
INVENTOR
Patrick J. Monahan Sullivan
BY
ATTORNEY P. J. M. SULLIVAN.
INTERNAL COMBUSTION ENGINE.
APPLICATION FILED NOV. 30, 1917.
1,274,813.
Patented Aug. 6, 1918.
5 SHEETS—SHEET 3.
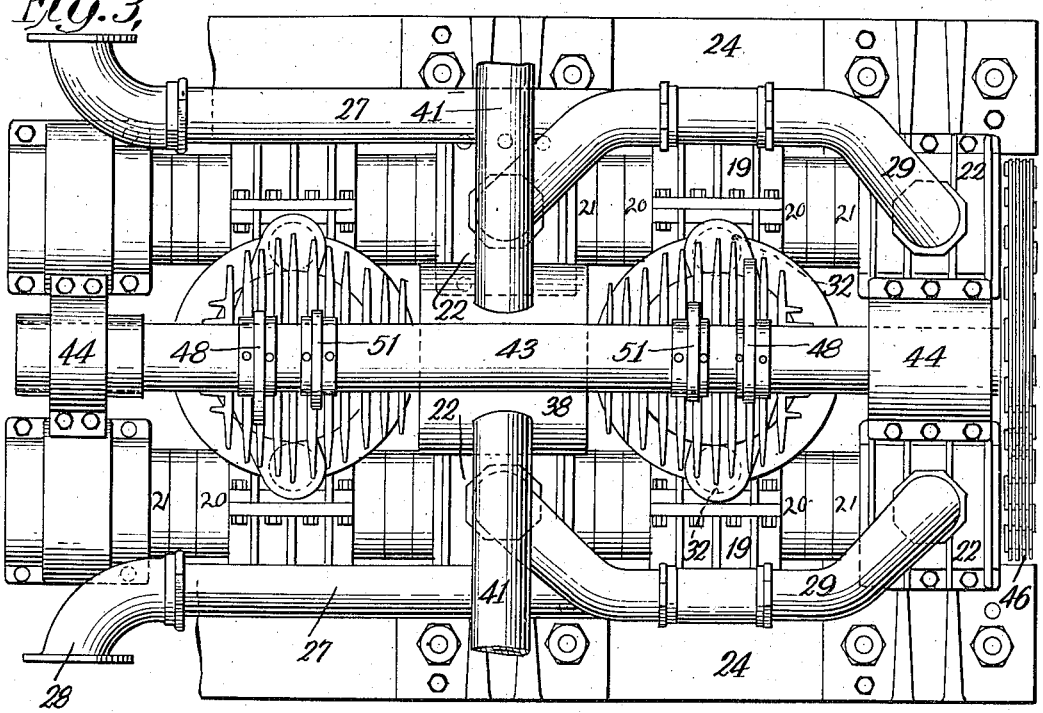
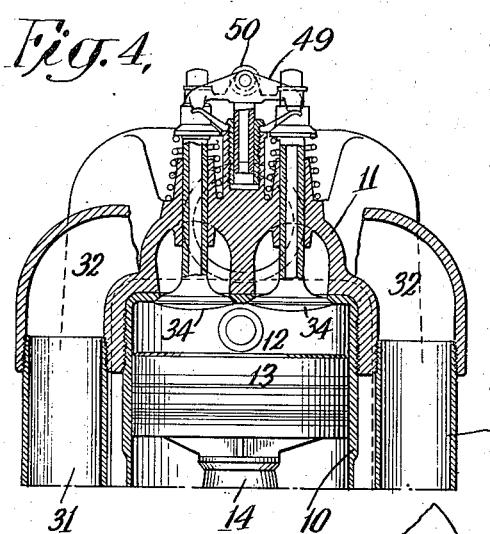
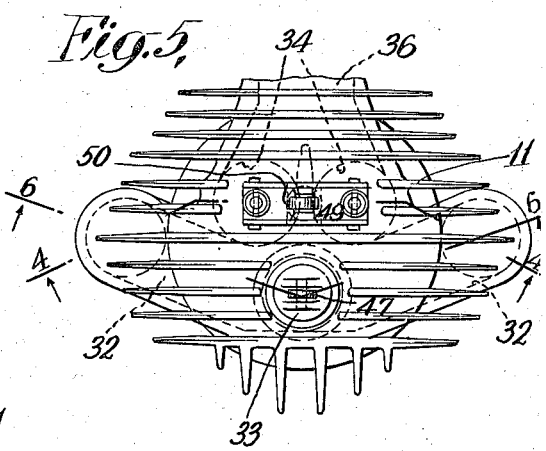
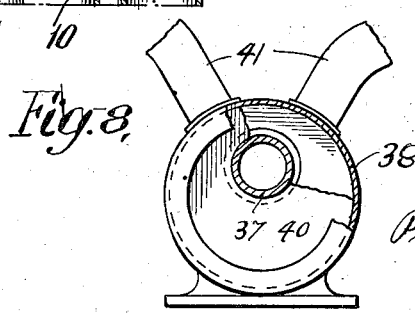
INVENTOR
Patrick J. Monahan Sullivan
BY
ATTORNEY

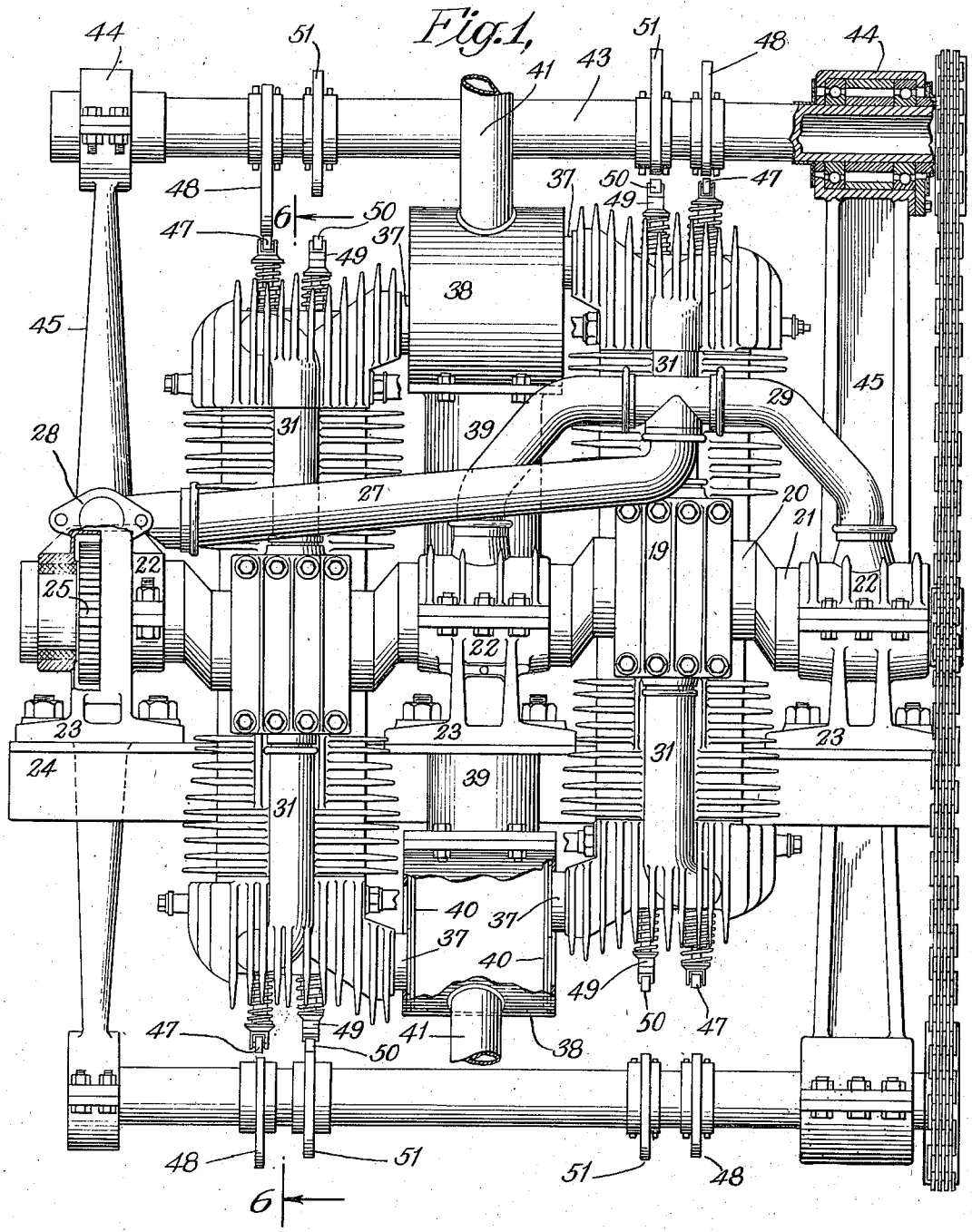

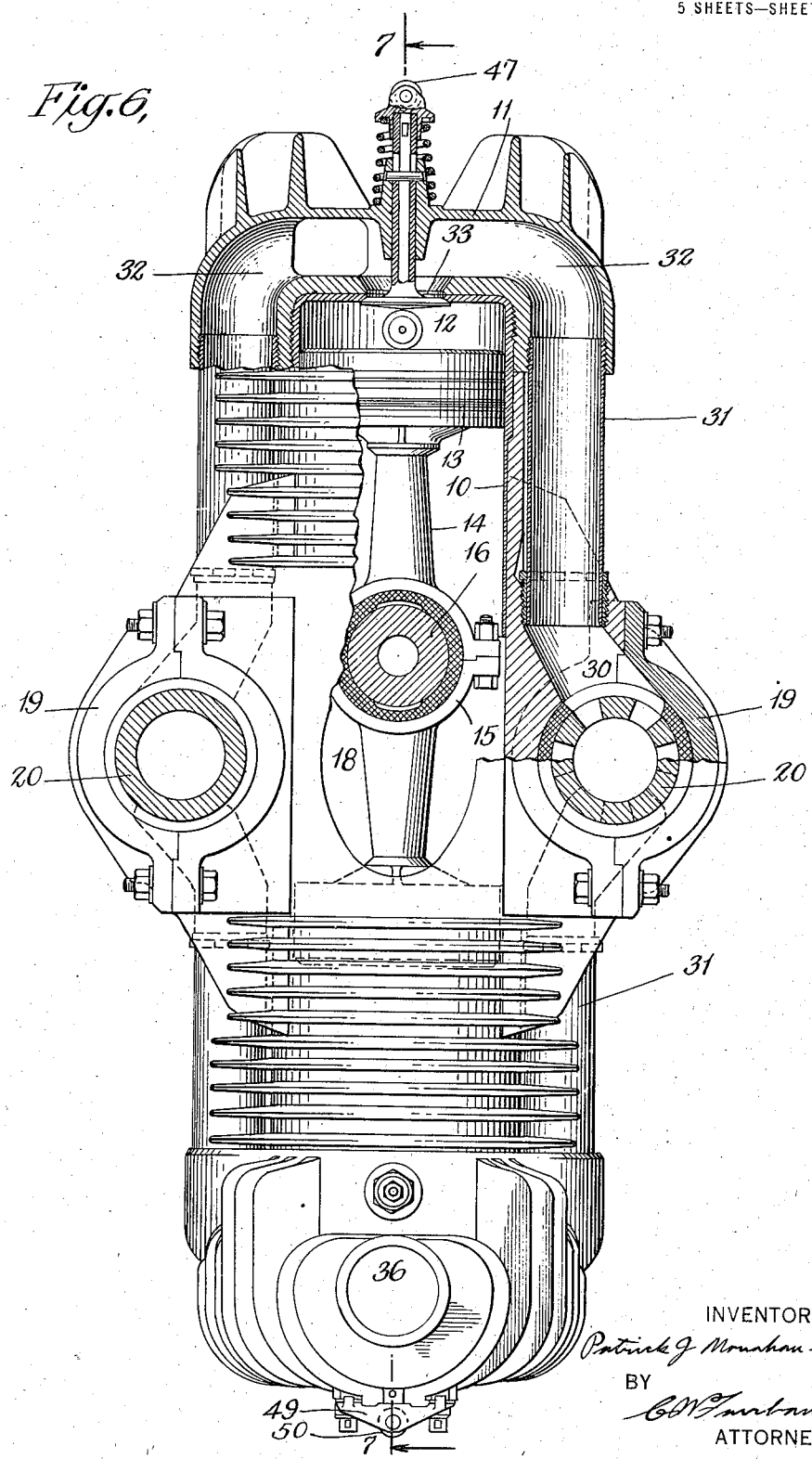

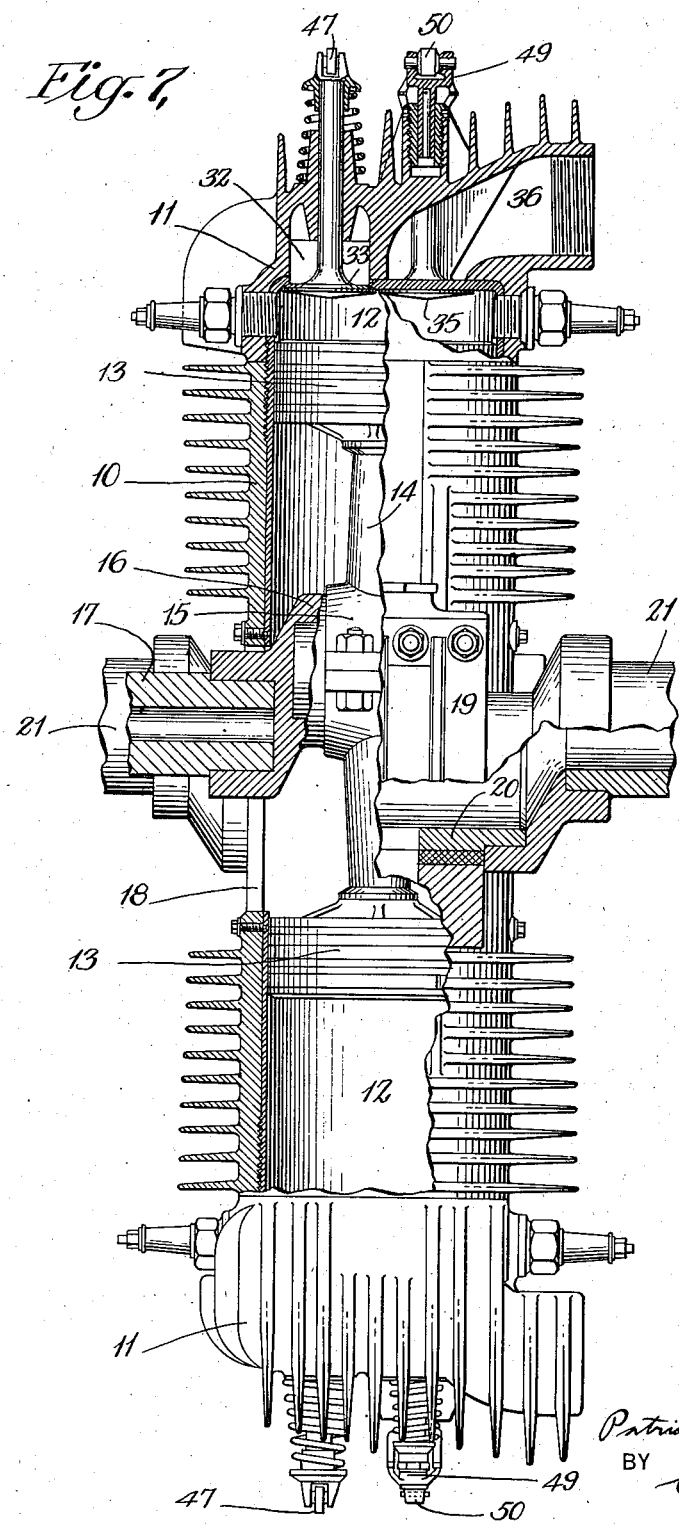

UNITED STATES PATENT OFFICE.

PATRICK J. MONAHAN SULLIVAN, OF WOODCLIFFE-ON-HUDSON, NEW JERSEY, ASSIGNOR TO MONAHAN ROTARY ENGINE CORPORATION, OF NEW YORK, N. Y., A CORPORATION OF NEW YORK.

INTERNAL-COMBUSTION ENGINE.

1,274,813.  Specification of Letters Patent.  Patented Aug. 6, 1918.

Application filed November 30, 1917. Serial No. 204,576.

*To all whom it may concern:*

Be it known that I, PATRICK J. MONAHAN SULLIVAN, a citizen of the United States, and resident of Woodcliffe-on-Hudson, in the county of Bergen and State of New Jersey, have invented certain new and useful Improvements in Internal-Combustion Engines, of which the following is a specification.

This invention is an internal combustion engine and involves particularly the mechanism employed for conducting the gas and controlling the flow thereof to and from the cylinder. Although my invention in some of its aspects may be used in an engine having the ordinary stationary cylinder, yet the main features are applicable only to an engine having a bodily movable cylinder, and other features are subsidiary to and useful only in connection with the type of engine disclosed and broadly claimed in my application Serial No. 204,575 filed November 30, 1917 in which the piston and the cylinder move in opposite directions at the same speed along separate non-concentric circular paths. Certain of the important advantages of such a novel and efficient mounting of the piston and cylinder are pointed out in said application, and certain of the improvements hereinafter broadly claimed are disclosed in other specific forms in my prior and copending applications, Serial No. 101,011 filed June 1, 1916, Serial No. 148,057 filed Feb. 12, 1917 and Serial No. 180,490 filed July 14, 1917 of which applications this application constitutes a continuation in part.

In my present improved construction, I utilize one or both of the crank shafts whose cranks support the cylinder as a conduit for supplying the fuel charge to the bodily movable cylinder, and as another important feature, I control the admission of the charge to the cylinder and the escape of the exhaust gas therefrom by valve operating mechanism mounted independently of the cylinder. Such mechanism is preferably in the form of a two-to-one cam shaft rotatable about a fixed axis and in respect to which the cylinder is bodily movable.

A further important feature involves a stationary manifold so designed and so constructed that it receives the exhaust gas from the cylinder during the bodily movement of the latter in respect to the manifold.

As a further important feature, I avoid the necessity for a heavy fly-wheel by so mounting a plurality of the bodily movable cylinders that they counter-balance each other and a uniform torque is imparted to the driven shaft or shafts.

Various other important features will be pointed out more particularly in connection with the detail description of one embodiment.

In the accompanying drawings, to which reference is to be had,

Figure 1 is a side elevation, several small portions being broken away or shown in section;

Fig. 2 is an end view;

Fig. 3 is a top plan view;

Fig. 4 is a longitudinal section through one end of one cylinder and showing the inlet conduits and exhaust valves, said section being taken substantially on the line 4—4 of Fig. 5;

Fig. 5 is an end view of one cylinder;

Fig. 6 is a side elevation of one cylinder on a somewhat larger scale and substantially on the line 6—6 of Fig. 1, a portion being shown on the line 6—6 of Fig. 5;

Fig. 7 is a central longitudinal section substantially on the line 7—7 of Fig. 6; and Fig. 8 is a face view of the exhaust manifold.

My improved engine may include as many cylinders as desired, all mounted on cranks of the same pair of crank-shafts. Although each cylinder may have only a single working chamber, yet I preferably form each cylinder with separate working chambers at opposite ends thereof. In other words, each cylinder is preferably a double-ended one or may be considered as two cylinders in axial alinement and rigidly connected together. Each cylinder is preferably mounted on a separate pair of cranks on the two crank-shafts although I might, in some constructions, form a plurality of cylinders in block and carry the block by a single pair of cranks.

Each cylinder is shown in the form of a tube 10 closed by suitable cylinder heads 11 at opposite ends and having separate working chambers 12 therein adjacent to said heads. Within the tube is a pair of pistons 13 rigidly connected by a piston rod 14 which, intermediate of its ends, has a bearing 15 for the crank 16 of a crank-shaft 17. Each cylinder intermediate of its ends has a slot or opening 18 through which said shaft may extend and upon opposite sides of said slot is a pair of bearings or journals 19 for the cranks 20 of a pair of crank shafts 21. The three shafts are in the same transverse plane, as is indicated particularly in Fig. 2, and are mounted in suitable bearings 22 carried by the bed or frame of the engine. This frame is illustrated as in the form of transversely extending castings 23 connected together and supported by longitudinally extending beams 24.

For insuring the simultaneous rotation of the three shafts at the same speed and with the shafts 21 rotating in one direction and the shaft 17 rotating in the opposite direction, the three shafts may be provided with a series of equal-diameter intermeshing gears 25 incorporated in or disposed adjacent to one of the bearing blocks 22.

To the extent so far described in detail, the engine may be substantially the same in construction and operation as is shown in my prior and co-pending application Serial No. 204,575, filed November 30, 1917, in which application said construction is broadly claimed and in some respects it may be similar in construction and operation to the form shown in my prior and co-pending application Serial No. 180,490 filed July 14th, 1917.

In order to conduct the explosive or fuel charge to the cylinder, I form one or both of the crank-shafts 21 and their cranks 20 as conduits through which fluid may pass from the source of supply to the inlet port. I have shown both of the crank-shafts 21 in the form of conduits, but it will be evident that only one may be so constructed. I have shown a supply conduit 27, one end of which has a connection 28 adapted to be secured to a carbureter or other source of explosive mixture and having its opposite end connected to a manifold 29, the two branches of which lead to two of the bearings 22. These bearings have passages leading to ports in the hollow crank-shaft so that the fuel charge may be continuously delivered into the crank-shaft during the rotation of the latter.

The portions of the cranks within the bearings 19 have ports as shown particularly at the right hand side of Fig. 6. The portions outside of said bearings are imperforate as shown at the left hand side of Fig. 6. Within the bearings 19 are passages 30 extending toward cylinder heads and communicating with and delivering to conduits or passages 32 in the cylinder heads. With both crank-shafts made hollow, there are two of these passages 32 in each cylinder head 11 and both deliver to a single valve 33. This is shown particularly as a puppet valve.

As the ports within the bearings 22 for the crank-shafts and the bearings 19 for the cranks, are always open, the explosive mixture may at all times pass directly to each and all of the inlet valves 33.

Each cylinder head has a pair of exhaust valves 34 shown particularly in Fig. 4 and in dotted lines in Fig. 5. These valves open to an exhaust chamber 36 in the cylinder head separate from the supply passages 32 and a conduit 37 connects with a manifold 38.

A single exhaust manifold may serve for two separate cylinders, as is shown particularly in Fig. 1. This manifold may be mounted on any suitable form of standard 39 carried by one of the transverse bearing blocks 23 and may be substantially in the form of a drum or cylinder with its ends presented toward the opposite engine cylinders. Each end wall 40 of the exhaust manifold may be rotatable within the peripheral wall of the manifold and may have an aperture therethrough closely fitting the exhaust conduit 37. By making the end walls 40 of the proper diameter and with the center of each exhaust conduit 37 at a distance from the center of the end wall 40 equal to the eccentricity of the cranks 20, the movement of the cylinders and the conduits 37 rigid with the latter will rotate said end walls and maintain a substantially air-tight connection between the exhaust passages 36 of the cylinder heads and the exhaust manifolds 38. The exhaust gas may be taken from these manifolds in any desired manner as they are stationary.

I have shown two branch conduits 41 leading from each manifold 38.

For operating the inlet and exhaust valves, I provide a cam shaft 43 mounted in suitable bearings 44 carried by standards 45 rigid with and mounted on the two end bearing blocks 23. This shaft may be driven at one-half the speed of any of the crank-shafts by any suitable form of power transmitting connections common in internal combustion engines. I have illustrated (see Fig. 2) the two crank-shafts 21 as each being provided with a sprocket wheel, the sprocket wheel of one shaft having a chain 46 for transmitting power to the upper cam shaft and the other having its chain transmitting power to the lower cam shaft.

The inlet and exhaust valves are of any suitable character common in internal combustion engines and are normally held to their seats by suitable coil springs. The inlet valve stem has a roller 47 at its upper end with which a cam 48 on the cam-shaft may engage while the valve stems of the two exhaust valves are connected by a transverse member 49 carrying a centrally disposed roller 50 with which a cam 51 on the cam-shaft may engage. The several cams are of such size and shape that during the rotation of the cam-shaft 43 and the bodily movement of the cylinders toward and from the crank-shaft, the inlet and exhaust ports will be opened and closed at the proper sequence.

The particular engine illustrated and above described is a multiple cylinder engine of the four-cycle type. It will of course be evident that many important features of my improved construction might be as advantageously and effectively used in a two-cycle as in a four-cycle engine. It will also be evident that whereas the engine illustrated has two separate units, a larger number might be employed or in fact only one unit need be used. When two or more units are employed the several cranks are so positioned in respect to each other that the different cylinders are in different portions of the cycle at any particular time. As shown in Fig. 1, the cranks for one unit are at 180° from those of the other so that while one cylinder is in its lowermost position, the other is in its uppermost position. This is of importance not only for the production of a uniform torque, but each cylinder acts to counter-balance the others and the necessity of any heavy fly-wheel is largely, if not entirely, avoided.

The bodily movement of the cylinders creates an automatic circulation of the air so that air-cooling may be relied upon with the corresponding saving in weight over a water-cooled engine.

As I have previously pointed out, my generic engine is broadly claimed in application Serial No. 204,575, and therefore in the present application I claim only such embodiments of my invention as differ from the specific form illustrated in said application. So far as the utilization of one of the cylinder supporting cranks as a conduit for the delivery of explosive mixture to the inlet valve is concerned, my present application is a continuation of and a substitute for my prior application Serial No. 101,011, filed June 1st, 1916. I here claim these features generically, reserving for application Serial No. 101,011, only such claims as are inapplicable to the present construction.

Having thus described my invention, what I claim as new and desire to secure by Letters Patent is:

1. In combination, a cylinder, a piston, a pair of cranks rotatable about parallel spaced axes for supporting said cylinder and permitting bodily movement of said cylinder along a circular path and with its axis maintained at all times in parallelism with an initial position, a crank connected to said piston and having the same throw as the first mentioned cranks, and gearing connecting one of said first mentioned cranks and said last mentioned crank for insuring simultaneous rotation in opposite directions, one of said first mentioned cranks having a gas passage therethrough communicating with the interior of said cylinder.

2. In combination, a cylinder, and a pair of spaced, parallel shafts having their cranks connected thereto for moving said cylinder bodily along a circular path, one of said cranks having a gas passage therethrough communicating with the interor of said cylinder.

3. In combination, a cylinder, a pair of cranks rotatable about parallel spaced axes for supporting the same and maintaining it at all times in parallelism with an initial position, a piston within said cylinder, and a crank connected to said piston and rotatable in the opposite direction to said first mentioned cranks, one of said cranks having a passage therethrough serving as an inlet to said cylinder.

4. In combination, a double-ended cylinder, a double-ended piston therein, means including a crank-shaft for supporting said cylinder and imparting a planetary movement thereto, means including a crank-shaft for imparting to said piston a planetary movement in the opposite direction, one of said crank-shafts having a supply passage therethrough communicating with the interior of said cylinder.

5. In combination, a pair of rigidly connected cylinders, a pair of separate pistons therein, a pair of crank-shafts having parallel axes and equal throw cranks, said cranks being connected to and supporting said cylinders to permit a bodily movement of the latter, and a third crank-shaft having its crank connected to said pistons to permit a bodily and opposite movement of the latter, one of said crank-shafts having a passage therethrough serving as a supply passage to one of said cylinders and another of said crank-shafts having a passage therethrough serving as a supply passage for the other cylinder.

6. In combination, a pair of rigidly connected cylinders, a pair of separate pistons therein, a pair of crank-shafts having parallel axes and equal throw cranks, said cranks being connected to and supporting said cylinders to permit a bodily movement of the latter, and a third crank-shaft having its crank connected to said pistons to permit a bodily and opposite movement of the latter, one of said first mentioned shafts having a supply passage therethrough and each of said cylinders having an inlet port and a passage connecting said port with said last mentioned shaft.

7. In combination, a double-ended cylinder having a port at each end thereof, a crank shaft having a stationary bearing and having its crank portion connected to said cylinder for supporting and bodily moving the latter, said shaft having a passage therethrough, and conduits connecting said ports with the interior of said shaft.

8. In combination, a double-ended cylinder having a port in each end thereof, a pair of spaced parallel shafts each having a crank connected to said cylinder and supporting the latter and maintaining it at all times in parallelism with an initial position, and separate passages extending lengthwise of said cylinder from each of said ports to each of said crank-shafts, each crank-shaft having a passage therethrough communicating with said first mentioned passages.

9. In combination, a cylinder having a bodily planetary movement while maintaining its axis in parallelism with an initial position, a piston having a bodily planetary movement in the opposite direction, and a crank-shaft having its crank connected to and bodily movable with said cylinder, said cylinder having a passage communicating with the interior thereof and said crank-shaft and its crank having a passage communicating with said first mentioned passage.

10. In combination, a cylinder having a bodily planetary movement while maintaining its axis in parallelism with an initial position, a piston having a bodily planetary movement in the opposite direction, and means for delivering explosive charge to said cylinder, said means including a hollow crank-shaft having its crank connected to said cylinder.

11. In combination, two members having bodily planetary movements in opposite directions while maintaining their common axis in parallelism with an initial position, one of said members comprising a piston and the other comprising a cylinder, and means for supplying explosive mixture to said cylinder, said means including a hollow crank-shaft having its crank connected to and movable with one of said members.

12. In combination, two members having bodily planetary movements in opposite directions while maintaining their common axis in parallelism with an initial position, one of said members comprising a piston and the other comprising a cylinder, and a crank-shaft having a passage extending through the body portion and the crank, and ports through the wall of said crank, said crank being secured to and movable with one of said members, and said last mentioned member having a passage leading from said port to the interior of said cylinder.

13. In combination, a cylinder having inlet and exhaust valves, means for supporting said cylinder and permitting a bodily movement thereof, and a cam-shaft mounted to rotate about a stationary axis and having cams for operating said valves during the bodily movement of said cylinder.

14. In combination, a cylinder having a bodily planetary movement in one direction while maintaining its axis in parallelism with an initial position, a valve carried by said cylinder, and a cam shaft rotatable about a stationary axis and having a cam for operating said valve.

15. In combination, a frame, three shafts arranged in a row and having equal throw cranks, a cylinder connected to and carried by two of said cranks, a piston connected to the crank of the third shaft, a cam-shaft carried by said frame and rotatable about a stationary axis, valve mechanism carried by said cylinder and operated from said cam-shaft, and means for rotating said cam-shaft from one of said crank-shafts.

16. In combination, a cylinder, means for supporting said cylinder and permitting of a bodily movement thereof while maintaining its axis in parallelism with an initial position, a cam mounted independently of said cylinder, a valve carried by said cylinder, and means adapted to periodically engage with said cam to operate said valve during said bodily movement of the cylinder.

17. In combination, a cylinder, a pair of spaced parallel shafts having their cranks connected thereto for bodily moving said cylinder and maintaining its axis in parallelism with an initial position, a valve carried by said shaft, a cam mounted independently of said cylinder, and means adapted to engage with said cam to intermittently operate said valve during said bodily movement.

18. In combination, a cylinder having a bodily planetary movement while maintaining its axis in parallelism with an initial position, a valve carried by said cylinder, and means mounted independently of said cylinder for periodically limiting the bodily movement of said valve with said cylinder and thereby effecting the opening of said valve.

19. In combination, a frame, a pair of spaced parallel shafts mounted in said frame and having parallel cranks, a cylinder mounted on and bodily carried by said cranks, a valve in the cylinder head and provided with a valve stem and means carried by said frame and disposed in the path of movement of said stem for intermittently opening the latter.

20. In combination, a cylinder having a bodily planetary movement while maintaining its axis in parallelism with an initial position, an exhaust conduit carried by said cylinder, and a stationary exhaust manifold having a movable wall connected to said exhaust conduit.

21. In combination, a cylinder having a bodily planetary movement while maintaining its axis in parallelism with an initial position, a conduit carried by said cylinder, and a stationary manifold having a movable wall connected to said exhaust conduit.

22. In combination, a cylinder having a bodily planetary movement while maintaining its axis in parallelism with an initial position and provided with a valve controlled conduit communicating with the interior thereof, a stationary manifold having a circular rotatable wall and eccentric connections between said wall and said conduit.

23. In combination, a pair of cylinders, a pair of pistons therein, a crank shaft having a pair of opposite throw cranks, one secured to one cylinder and the other secured to the other cylinder for giving to said cylinders planetary movements in the same direction, one cylinder serving to counter-balance the other, a second crank shaft having opposite throw cranks secured to said pistons, and connections between said crank shafts for insuring their simultaneous opposite rotation.

24. In combination, a pair of parallel shafts, each having a pair of opposite throw cranks, a pair of cylinders, one secured to and carried by one crank of one shaft and an adjacent parallel crank of the other shaft, and the other cylinder secured to and carried by the other opposite throw cranks of said shafts whereby during the simultaneous rotation of said shafts in the same direction said cylinders travel in circular paths while maintaining their axes parallel to each other and to an initial position and one cylinder counter-balances the other, a pair of pistons, and means for effecting their relative reciprocation in said cylinders during said travel of the latter.

25. In combination, a plurality of parallel cylinders, means for supporting them and imparting thereto planetary movements in the same direction, said cylinders being spaced at equal distances apart in the path of movement whereby they counter-balance each other in respect to the center of movement, and pistons in said cylinders having planetary movements in the opposite direction and similarly spaced in said path.

Signed at New York, in the county of New York, and State of New York, this 26th day of November, A. D. 1917.

PATRICK J. MONAHAN SULLIVAN.